United States Patent
Shima (10) Patent No.: US 10,879,946 B1
(45) Date of Patent: Dec. 29, 2020

(54) WEAK SIGNAL PROCESSING SYSTEMS AND METHODS

(71) Applicant: Ball Aerospace & Technologies Corp., Boulder, CO (US)

(72) Inventor: James M. Shima, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/668,826

(22) Filed: Oct. 30, 2019

Related U.S. Application Data (60) Provisional application No. 62/752,663, filed on Oct. 30, 2018.

(51) Int. Cl.

| | | |
|---|---|---|
| *H04B 1/12* | (2006.01) | |
| *H04B 7/08* | (2006.01) | |
| *G06F 17/14* | (2006.01) | |
| *G06N 3/08* | (2006.01) | |
| *G06N 3/04* | (2006.01) | |

(52) U.S. Cl.
CPC ............ *H04B 1/123* (2013.01); *G06F 17/14* (2013.01); *G06N 3/04* (2013.01); *G06N 3/08* (2013.01); *H04B 7/08* (2013.01)

(58) Field of Classification Search
CPC . H04B 1/123; H04B 7/08; H04B 1/10; H04B 1/1027; G06F 17/14; G06F 2119/10; G06N 3/04; G06N 3/08
See application file for complete search history.

(56) References Cited

U.S. PATENT DOCUMENTS

| | | | | |
|---|---|---|---|---|
| 5,588,073 A | * | 12/1996 | Lee ................... | G06K 9/00422 382/158 |
| 5,719,794 A | | 2/1998 | Altshuler et al. | |
| 5,960,391 A | * | 9/1999 | Tateishi ............. | G10L 21/0272 704/202 |
| 6,075,991 A | | 6/2000 | Raleigh et al. | |
| 6,252,627 B1 | | 6/2001 | Frame et al. | |

(Continued)

OTHER PUBLICATIONS

U.S. Appl. No. 16/597,411, filed Oct. 9, 2019, Schmidt et al.

(Continued)

*Primary Examiner* — Nguyen T Vo
(74) *Attorney, Agent, or Firm* — Sheridan Ross P.C.

(57) ABSTRACT

Methods and systems for processing a noisy time series input to detect a signal, generate a de-noising mask, and/or output a de-noised time series output are provided. The input is transformed into one or more datagrams, such as real and imaginary time-frequency grams. The datagrams are stacked and provided as first and second channel inputs to a neural network. A neural network is trained to detect signals within the input. Alternatively or in addition, the network is trained to generate a de-noise mask, and/or to output a de-noised time series output. Implementation of the method and systems can include the use of multiple deep neural networks (DNNs), such as convolutional neural networks (CNN's), that are provided with inputs in the form of RF spectrograms. Embodiments of the present disclosure can be applied to various RF devices, such as communication devices, including but not limited to multiple inputs multiple output (MIMO) devices and 5G communication system devices, and RADAR devices.

20 Claims, 6 Drawing Sheets

(56) References Cited

U.S. PATENT DOCUMENTS

| | | | |
|---|---|---|---|
| 6,437,692 | B1 | 8/2002 | Petite et al. |
| 6,597,394 | B1 | 7/2003 | Duncan et al. |
| 6,820,053 | B1* | 11/2004 | Ruwisch ............ G10L 21/0208 |
| | | | 381/94.3 |
| 7,020,501 | B1 | 3/2006 | Elliott et al. |
| 7,590,098 | B2 | 9/2009 | Ganesh |
| 8,019,544 | B2 | 9/2011 | Needelman et al. |
| 8,583,371 | B1 | 11/2013 | Goodzeit et al. |
| 8,929,936 | B2 | 1/2015 | Mody et al. |
| 9,073,648 | B2 | 7/2015 | Tsao et al. |
| 9,191,587 | B2 | 11/2015 | Wright et al. |
| 9,294,365 | B2 | 3/2016 | Misra et al. |
| 9,449,374 | B2 | 9/2016 | Nash et al. |
| 9,702,702 | B1 | 7/2017 | Lane et al. |
| 9,924,522 | B2 | 3/2018 | Gulati et al. |
| 9,927,510 | B2 | 3/2018 | Waldron et al. |
| 10,021,313 | B1 | 7/2018 | Chen et al. |
| 10,048,084 | B2 | 8/2018 | Laine et al. |
| 10,271,179 | B1 | 4/2019 | Shima |
| 2005/0049876 | A1* | 3/2005 | Agranat ............... A01K 11/008 |
| | | | 704/270 |
| 2005/0228660 | A1* | 10/2005 | Schweng ................ G10L 21/02 |
| | | | 704/226 |
| 2006/0030332 | A1 | 2/2006 | Carrott et al. |
| 2007/0010956 | A1 | 1/2007 | Nerguizian et al. |
| 2008/0045235 | A1 | 2/2008 | Kennedy et al. |
| 2008/0293353 | A1 | 11/2008 | Mody et al. |
| 2009/0197550 | A1 | 8/2009 | Huttunen et al. |
| 2009/0268619 | A1 | 10/2009 | Dain et al. |
| 2012/0071105 | A1 | 3/2012 | Walker et al. |
| 2012/0072986 | A1 | 3/2012 | Livsics et al. |
| 2012/0163355 | A1 | 6/2012 | Heo et al. |
| 2012/0202510 | A1 | 8/2012 | Singh |
| 2012/0238201 | A1 | 9/2012 | Du et al. |
| 2012/0238220 | A1 | 9/2012 | Du et al. |
| 2014/0282783 | A1 | 9/2014 | Totten et al. |
| 2014/0329540 | A1 | 11/2014 | Duggan et al. |
| 2015/0009072 | A1 | 1/2015 | Nijsure |
| 2016/0173241 | A1 | 6/2016 | Goodson et al. |
| 2017/0120906 | A1 | 5/2017 | Penilla et al. |
| 2017/0366264 | A1 | 12/2017 | Riesing et al. |
| 2018/0019910 | A1 | 1/2018 | Tsagkaris et al. |
| 2018/0025641 | A1 | 1/2018 | LaVelle et al. |
| 2018/0033449 | A1* | 2/2018 | Theverapperuma .... G10L 25/84 |
| 2018/0082438 | A1 | 3/2018 | Simon et al. |
| 2018/0107215 | A1 | 4/2018 | Djuric et al. |
| 2018/0149730 | A1* | 5/2018 | Li ........................ G01S 13/931 |
| 2018/0324595 | A1 | 11/2018 | Shima |
| 2019/0066713 | A1* | 2/2019 | Mesgarani ............ A61B 5/0402 |
| 2019/0122689 | A1* | 4/2019 | Jain ........................... G06N 3/08 |
| 2019/0294108 | A1* | 9/2019 | Ozcan .................. G03H 1/2202 |
| 2019/0318725 | A1* | 10/2019 | Le Roux ............... G10L 15/063 |
| 2019/0353741 | A1* | 11/2019 | Bolster, Jr. ....... G01R 33/56509 |
| 2019/0363430 | A1* | 11/2019 | Wang ..................... H01Q 21/24 |

OTHER PUBLICATIONS

U.S. Appl. No. 16/693,992, filed Nov. 25, 2019, Tchilian.
U.S. Appl. No. 16/475,725, filed Jan. 17, 2020, Tchilian et al.
U.S. Appl. No. 16/806,367, filed Mar. 2, 2020, Frye et al.
U.S. Appl. No. 16/886,983, filed May 29, 2020, Regan.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
International Search Report and Written Opinion for International (PCT) Patent Application No. PCT/US2018/031395, dated Jul. 30, 2018 15 pages.
International Preliminary Report on Patentability for International (PCT) Patent Application No. PCT/US2018/031395, dated Nov. 14, 2019 14 pages.
Official Action for U.S. Appl. No. 15/973,003, dated Mar. 20, 2020 35 pages.
Gu et al. "Continuous Deep Q-Learning with Model-based Acceleration," Proceedings of Machine Learning Research, vol. 48, 2016, pp. 2829-2838.
Happel et al. "The Design and Evolution of Modular Neural Network Architectures," Neural Networks, 1994, vol. 7, pp. 985-1004.
Johnson "Orbital Debris: The Growing Threat to Space Operations," 33rd Annual Guidance and Control Conference, Feb. 6, 2010, Breckenridge, CO, United States.
Peng et al. "Improving Orbit Prediction Accuracy through Supervised Machine Learning,", Jan. 2018.
Taylor "Transfer Learning for Reinforcement Learning Domains: A Survey," Journal of Machine Learning Research, 2009, vol. 10, pp. 1633-1685.
Watkins "Learning from Delayed Rewards," King's College, May 1989, Thesis for Ph.D., 241 pages.
Goodfellow et al. "Deep Learning," MIT Press, 2016, 796 pages [retrieved online from: www.deeplearningbook.org].

* cited by examiner

WEAK SIGNAL PROCESSING SYSTEMS AND METHODS

CROSS-REFERENCE TO RELATED APPLICATIONS

This application claims the benefit of U.S. Provisional Patent Application Ser. No. 62/752,663, filed Oct. 30, 2018, the entire disclosure of which is hereby incorporated herein by reference.

FIELD

Systems and methods for processing weak signals are provided.

BACKGROUND

Radio frequency (RF) communications have become an extremely common technique for operatively connecting communications and other devices. As a result, the radio frequency spectrum available for additional transmitters or services has become increasingly crowded. Accordingly, there is a need to identify desired or meaningful signals within a noisy RF environment.

In many RF applications, including but not limited to wireless satellite and non-satellite based communications and RADAR applications, signal detection and classification is a challenge due to factors such as in and out of band noise and interferences. For example, supporting high mobility in millimeter wave (mmWave) systems such as those in Fifth Generation (5G) wireless will enable a wide range of important applications such as vehicular communications and wireless virtual/augmented reality. Realizing this in practice, though, requires overcoming several challenges. First, in a massive input massive output (MIMO) architecture, the use of narrow beams and the sensitivity of mmWave signals to blockage, multipath losses, weather conditions, user near-far positioning with respect to a communication node (e.g., a Base Station (BS)), and in and out of band and channel noise and interferences can lead to weak signals received at a node, which greatly impact the coverage, reliability, and quality of service of the communication links.

As one technique for detecting the presence of a signal, energy detectors have been developed. In a typical energy detection system, a sample of the signals present in the environment is acquired and converted into the digital domain. A magnitude of the samples is determined by squaring and then adding the real and imaginary components of the sampled signals. If the resulting magnitude is determined to be above some predetermined threshold, a signal is present. However, energy detection systems are typically unable to determine whether a desired signal is present, and instead will indicate that a signal is detected in response to the presence of an interferer.

Other techniques for detecting the presence of signals apply filters. In a matched filter system, a reverse template of a transmitted signal is used to determine whether a return signal has been received. While this approach can provide high sensitivity, it is only operable where detailed parameters of the waveform of the signal to be detected are known in advance.

In addition to signal detection, it is desirable to provide de-noised signals. However, signal detection systems have been limited to simple detection, leaving de-noising systems to be provided separately. In a typical de-noising system, filters are applied to remove out of band signals. However, filter arrangements for de-noising have required prior knowledge of the desired signal, and have been limited in their ability to extract desired signals.

SUMMARY

In accordance with embodiments of the present disclosure, signal processing systems and methods are provided that enable signal detection, de-noising, and extraction of desired signals in noisy environments. More particularly, embodiments of the present disclosure enable the detection of even low energy and low probability of detection, transient signals. Once a signal is detected, embodiments of the present disclosure can output a de-noised signal.

In addition, novel deep learning systems and methods for detecting, classifying, extracting, and processing weak RF signals are provided. In at least some embodiments, novel deep learning systems and methods for detecting weak RF signals are disclosed. Such systems and methods can also determine the probabilities associated with detecting a signal in a noisy environment. In other embodiments, novel deep learning systems and methods for extracting and characterizing weak RF signal parameters with a more advanced de-noising architecture that include but are not limited to the processing of complex valued information, retaining the information contained in the weak signal after extraction, are provided.

Embodiments of the present disclosure include receiving a time series input from the environment, such as but not limited to a noisy environment. In a preprocessing stage, the time series input is transformed to a complex valued data set, for example using a fast Fourier transform (FFT), a short-time Fourier transform (STFT), a discrete Fourier transform (DFT), a Haar transform, a wavelet transform, a Hadamard transform, a discrete cosine transform, a Gabor transform, or a Karhunen-Loeve transform. More particularly, the real components of the transformed data are formatted as a first two-dimensional time-frequency gram or spectrogram, and the imaginary components of the transformed data are formatted as a second two-dimensional time-frequency gram or spectrogram. These spectrograms are then input as stacked first and second channels of a neural network.

The neural network, which may comprise a convolutional neural network, deep learning network, or the like, is trained using examples of desired signals and noise to detect the presence of a signal. In accordance with further embodiments of the present disclosure, the neural network is trained to create a de-noising mask for a signal. In accordance with still further embodiments of the present disclosure, the neural network is trained to provide a de-noised output. A de-noised output from the neural network can be provided as two-channels, with the first channel including real components output as a first spectrogram, and the second channel including imaginary components output as a second spectrogram. The two channels of output data can then be combined into a complex valued output, which can in turn be inversely transformed, for example using an inverse STFT, to output a de-noised time series signal.

Additional features and advantages of embodiments of the disclosed systems and methods will become more readily apparent from the following description, particularly when taken together with the accompanying drawings.

DETAILED DESCRIPTION

Embodiments of the present disclosure provide signal processing systems and methods for processing signals, including but not limited to radio frequency (RF) signals, in noisy environments. At least some embodiments of the present disclosure operate to detect desired signals in noisy environments. Other embodiments provide systems and methods for providing a de-noise mask. Further embodiments provide systems and methods for providing a de-noised output that includes a signal obtained from a noisy environment.

In accordance with embodiments of the present disclosure, the systems and methods can include transforming RF time series data into a two-dimensional datagram that presents some signal parameter or parameters versus time. As an example, but without limitation, a datagram can include a complex valued time-frequency gram or spectrogram. For instance, a first spectrogram containing the real values from the complex valued transform and a second spectrogram containing the imaginary values from the complex valued transform are created from a time series data input. These first and second spectrograms are input as first and second channels to a neural network. The neural network is trained to detect signals, and in particular to detect signals within a noisy environment. Further embodiments of the present disclosure include a neural network that is trained to output a signal mask that can be used to facilitate the reception of a signal. Still further embodiments of the present disclosure include a neural network that is trained to output a de-noised time series output signal.

Figure 1:
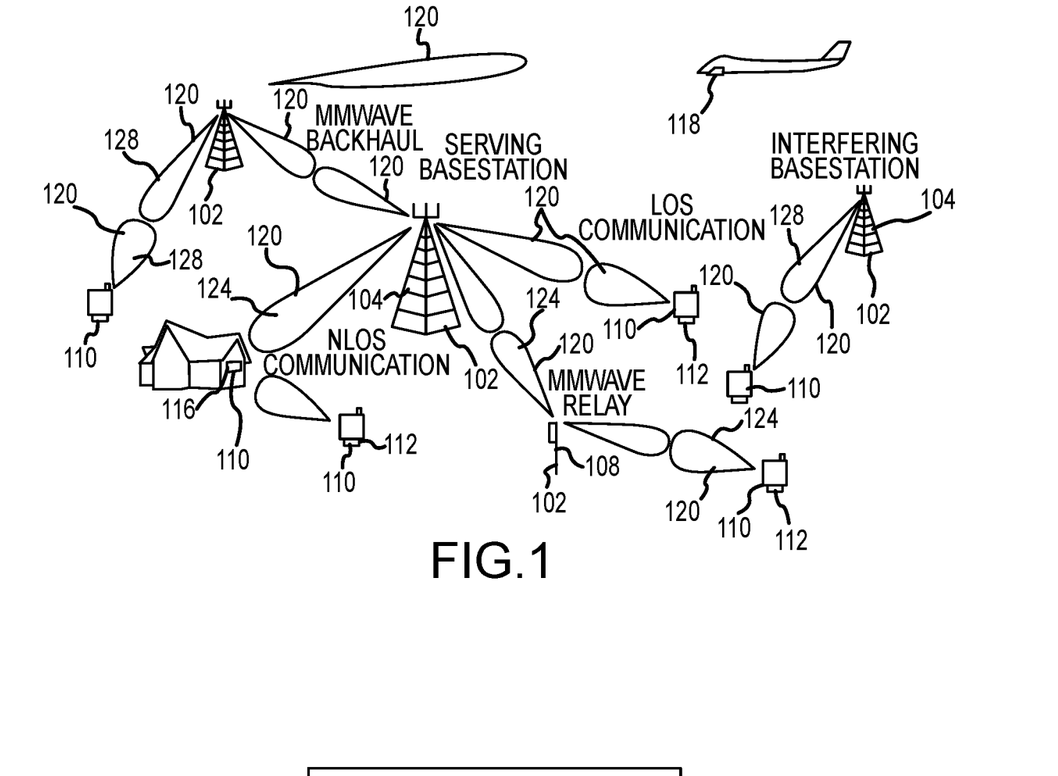
FIG. 1 illustrates an example environment in which noise and desired signals are present and in which a signal processing network in accordance with embodiments of the present disclosure can be deployed.

FIG. 1 illustrates an example environment in which noise and desired signals are present, and in which a signal processing network in accordance with embodiments of the present disclosure can be deployed. As shown, the environment can include multiple fixed radio frequency installations 102, such as cellular network base stations 104 and relays 108. In addition, the environment can include multiple communication devices 110, such as mobile phones 112 and Internet of things (TOT) devices 116. In accordance with still other embodiments of the present disclosure, a communication device 110 can include a signal or radar warning receiver or other signal receiver 118 that operates to detect desired or target signals 124, including signals that are indicative of a hostile or target installation 102 or device 110, that are returns of interrogatory signals, or that are otherwise of interest. In general, the RF installations 102 and communication devices 110 can receive and transmit signals 120, such as signals comprising electromagnetic waves. Accordingly, embodiments of the present disclosure can be deployed in connection with a cellular or other communications system, including but not limited to a 5G communication system. As a further example, embodiments of the present disclosure can include a radar system, a sonar system, or any other system in which desired or target time series signals 124 and interfering signals 128 are present.

As can be appreciated by one of skill in the art after consideration of the present disclosure, radio frequency installations 102, communication devices 110, or other sources of signals 120, whether provided as part of a communication or other network that is also a source of a signal 120 that is a desired or target signal 124, a co-located communication network, or an intentional interferer, can generate interfering signals 128 (i.e. signals that interfere with the reception of a desired signal 124). Accordingly, a communication network node, such as a radio frequency installation 102 or a communication device 110, must be able to detect and extract a desired signal 124 from an environment that includes other signals 128 and/or other noise sources. Similarly, any other device or system that relies on the reception of one or more signals 120 in a noisy environment, such as a radar or sonar system, requires the ability to detect and extract a desired or target signal 124 from within a noisy environment. As discussed herein, embodiments of the present disclosure provide signal processing systems and methods that are capable of operating as part of or in support of systems or system components to reliably detect and extract signals from within noisy environments.

Figure 2:
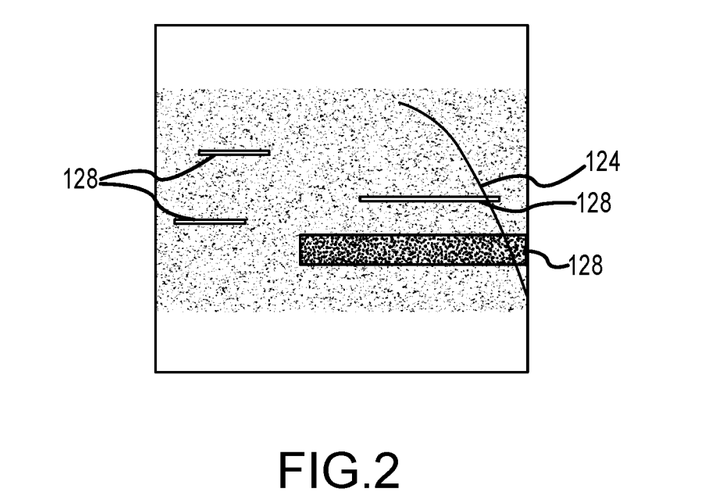
FIG. 2 depicts an example spectrogram of a radio frequency environment in which noise and a desired signal are present.

FIG. 2 depicts an example spectrogram of a radio frequency environment in which noise and a desired signal is present. In particular, a radio frequency spectrogram is a two-dimensional representation of a spectrum of frequencies of time varying signals. The illustrated spectrogram includes a depiction of a desired signal 124 and a number of interfering signals 128. Specifically, the frequency of the signal (the Y-axis in the figure) is shown over time (the X-axis in the figure). Although particular example embodiments of the present disclosure that create and process spectrograms will be described, it should be appreciated that other two-dimensional representations or datagrams of signals 120 can be produced during a transform procedure, and can then be processed as also discussed herein. Embodiments of the present disclosure provide systems and methods implementing a signal processing network that can detect, extract, or detect and extract a desired signal or set of signals 124 from within an environment that includes interfering signals 128 or other sources or noise.

Figure 3:
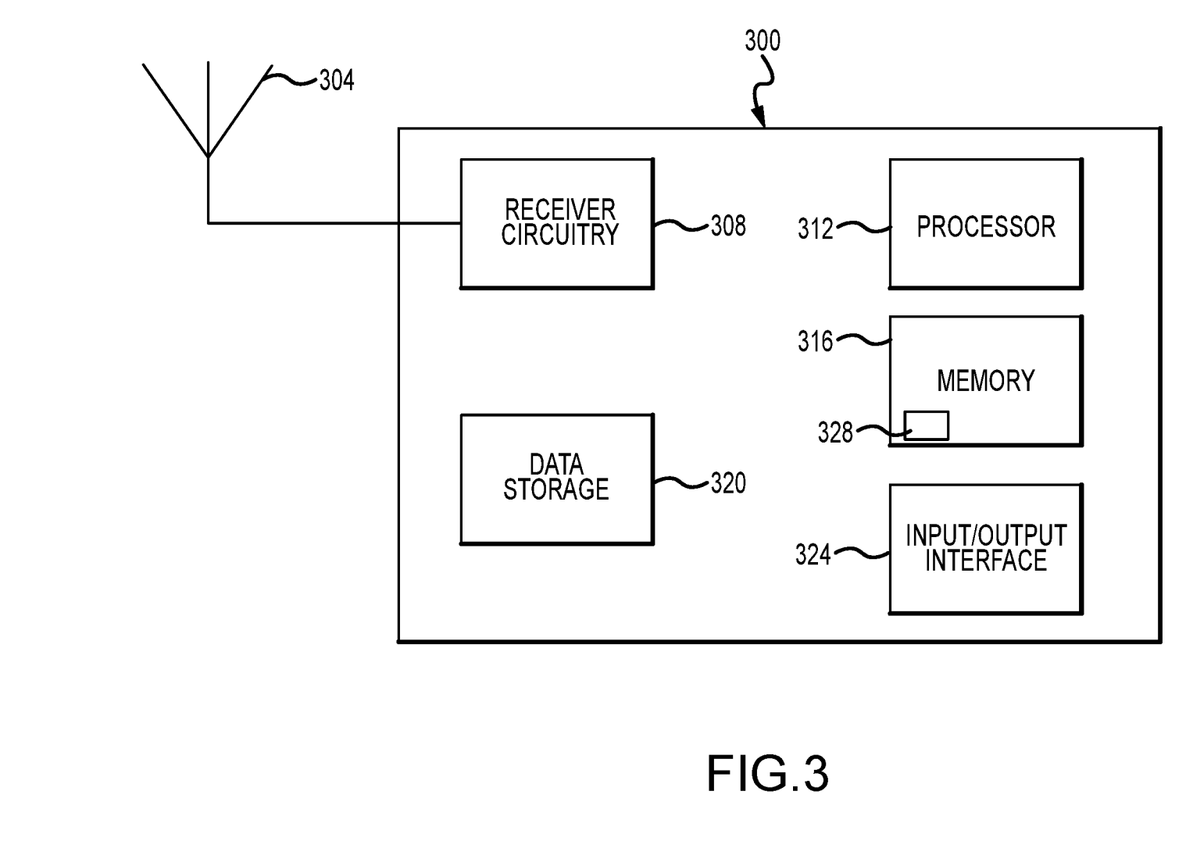
FIG. 3 depicts components of a system implementing a signal processing network in accordance with embodiments of the present disclosure.

FIG. 3 depicts components of a signal processing system 300 implementing a signal detection network in accordance with embodiments of the present disclosure. As shown, the system 300 can include an antenna 304, receiver circuitry 308, a processor 312, memory 316, data storage 320, and an input/output device or interface 324. The antenna 304 is configured to receive signals 120 within at least a selected range of frequencies. Accordingly, examples of an antenna 304 can include monopole, dipole, horn, planar array, or any other antenna configuration. As can be appreciated by one of skill in the art after consideration of the present disclosure, the antenna 304 can be replaced by a microphone or other sensor in connection with a signal processing system 300 that is configured to detect and/or extract a desired signal 124 having a frequency or range of frequencies that are outside of the radio frequency spectrum.

The signals 120 collected by the antenna 304 or other sensor are provided to the receiver circuitry 308. The receiver circuitry 308 can include filters, amplifiers, mixers, and the like. Examples of receiver circuitry 308 therefore include a radio frequency receiver or transceiver, or an audio frequency receiver or transceiver. As can be appreciated by one of skill in the art after consideration of the present disclosure, the receiver circuitry 308 can output a raw or noisy time series signal or collection of signals 120 as a voltage that varies over time at the original or a different (modulated) frequency. Moreover, while the receiver circuitry 308 can include filters or other processors that remove some unwanted signals 128, the output from the receiver circuitry 308 can include unwanted signals 128 and other noise in addition to desired signals 124.

The processor 312 can include one or more general purpose processors, graphical processing units (GPUs), multi-core processors, controllers, field programmable gate arrays (FPGAs), or the like. The processor 312 generally operates to execute programming code or instructions, such as instructions 328 stored in the memory 316 and/or data storage 320, that implements a signal processing network in accordance with embodiments of the present disclosure. The memory 316 can include, for example, volatile or non-volatile memory, and can provide short or long-term storage for application programming or instructions, control parameters, intermediate data products, data, detection results, de-noise masks generated by the system 300, detected signals, or the like. The data storage 320 generally includes non-volatile storage for application programming or instructions, control parameters, intermediate data products, data, detection results, de-noise masks generated by the system 300, detected signals, or the like. The input/output interface 324 can support communications between the signal processing system 300, co-located systems or communication nodes, and remote systems or communication nodes. Moreover, the input/output interface 324 can operate to receive instructions and data, including training data, and to provide output, including output generated by operation of a signal processing network implemented by the signal processing system 300. The input/output interface 324 can include a data port or one or more devices connected to a data port, such as but not limited to a display, a communication channel, a transmitter, etc.

Figure 4:
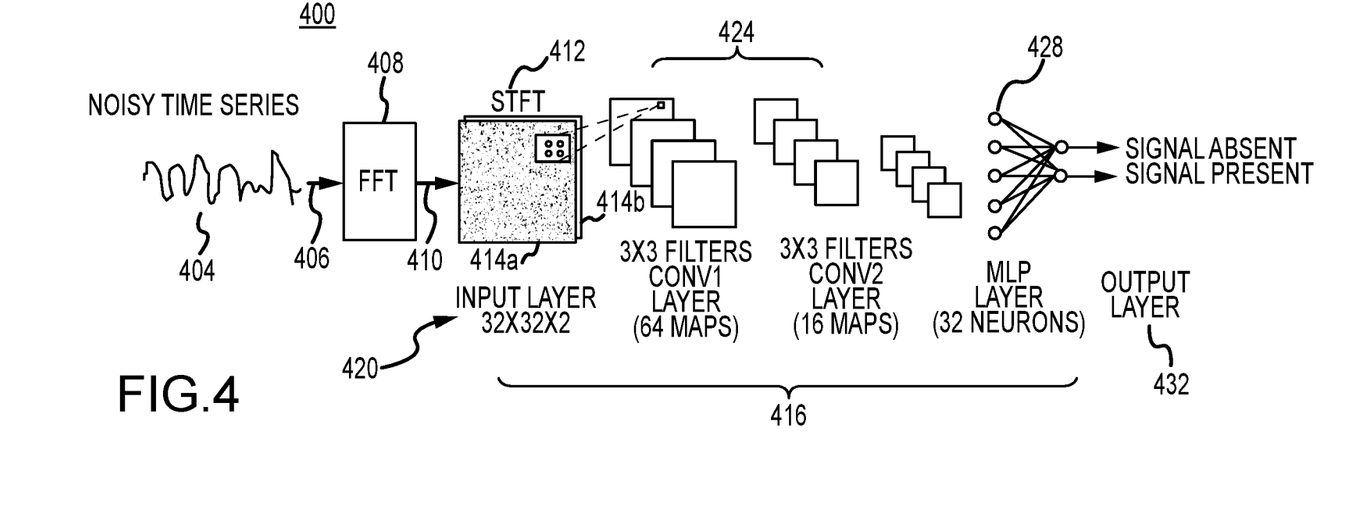
FIG. 4 depicts a signal detection network in accordance with embodiments of the present disclosure.

FIG. 4 depicts a signal processing network, and in particular a signal detection network 400, in accordance with embodiments of the present disclosure. The signal detection network 400 can be implemented by a signal processing system 300. The signal detection network 400 is generally provided with received time series energy 404 that includes any number of time series signals 120. In a typical implementation, the received energy 404 includes one or more desired signals 124 and one or more interfering signals 128 or other noise. As used herein, the signals 120 included in the received energy 404 can include a communication signal, a radar return, or any other RF signal. Alternatively, a signal 120 can be at frequencies outside of the electromagnetic spectrum. Noise can be an interfering or undesired signal 128, a collection of interfering or undesired signals 128, or the like. The received energy 404 can be collected by an antenna or other sensor 304 and provided to receiver circuitry 308 for conversion to a time-varying voltage 406.

The received energy 404, as represented by the time-varying voltage 406, is transformed in a transform block 408 from a time series signal to a two-dimensional datagram 410, such as but not limited to a time-frequency gram. As an example, the transform block 408 may be implemented by the execution of instructions 328 by the processor 312, and may perform a fast Fourier transform (FFT), a short-time Fourier transform (STFT), a discrete Fourier transform (DFT), a Haar transform, a wavelet transform, a Hadamard transform, a discrete cosine transform, a Gabor transform, a Karhunen-Loeve transform, or the like of the time varying voltage 406 to create the two-dimensional data 410. As can be appreciated by one of skill in the art after consideration of the present disclosure, the time-frequency gram 410 output of the transform block 408 can include real and imaginary values, for example where the transform block implements a Fourier transform. In accordance with embodiments of the present disclosure, the real values are input to an input layer 412 of a neural network 416 as a first channel of information, and the imaginary values are input to the input layer 412 as a second channel of information. For instance, the real data, representing the magnitude of the input RF energy 404, is provided as a first two-dimensional data gram or spectrogram 414a to the first channel of the input layer 412, and the imaginary data, representing the phase of the input RF energy 404, is provided as a second two-dimensional data gram or spectrogram 414b to the second channel of the input layer 412. In addition, the first 414a and second 414b datagrams have the same dimensions as one another, and are provided as stacked inputs. Accordingly, embodiments of the present disclosure provide a signal detection network that can operate on complex valued data from a spectrogram.

In addition to the input layer 412, the neural network 416 can include a plurality of other layers 420. For example, the neural network 416 can include one or more convolution layers 424, fully connected or multilayer perceptron (MLP) layers 428, or the like. The neural network 416 also includes an output layer 432. The neural network 416 and its included layers 420 can be implemented by the execution of instructions 328 by the processor 312 of a signal processing system 300 as described herein. The neural network 416 is trained by providing inputs in the form of noise, and inputs in the form of desired signals. The data used for training can be provided through the antenna 304 or other sensor of a signal processing system 300 implementing the signal processing network. Alternatively or in addition, training data can be provided through the input/output interface 324 of a signal processing system 300 implementing the signal processing network. In at least some implementations, the neural network 416 is trained such that, in an operational state, the signal detection network 400 operates to detect the presence of a desired or target signal 124 within the received RF energy 404, and to provide an output 432 indicating whether a desired signal 124 is present or not. The output 432 can be applied by receiver components included as part of the system 300, and can be provided to other systems or nodes.

Figure 5:
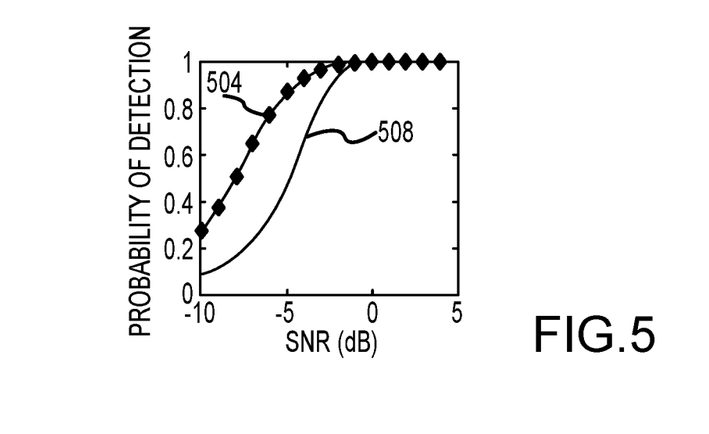
FIG. 5 is a graph depicting the detection performance of a signal detection network in accordance with embodiments of the present disclosure.

FIG. 5 depicts an example probability of detecting a desired signal 124 using a signal detection network 400 as provided herein (plot 504) and the probability of detecting the desired signal using a conventional energy detection technique (plot 508) at different signal 124 strengths in the presence of additive white Gaussian noise (AWGN). As shown, a signal detection network 400 that has been trained and configured to output a classification probability as to whether a desired signal 124 is detected or not can provide an enhanced probability of detection for a given signal 124 strength as compared to the probability of detection using an energy detection technique 508. A signal detector implemented by a signal detection network 400 as described herein can also outperform classical detection methods when a signal is embedded in non-noise interference. Moreover, the signal detection network 400 can be trained to detect RADAR pulses using signals of different pulse widths, pulse rate intervals, compression ratios, center frequencies, and signal to noise ratios. Interferers can be added with AWGN to model real-life RF environments, including the presence of continuous wave signals, communication signals, impulses, and RF hash or interference. For instance, an example signal detection network 400 in accordance with embodiments of the present disclosure was trained on 60,000 randomly generated RF spectrograms with a signal to noise ratio (SNR) of the pulses ranging from −4 to +7 dB and a pulse width of from 1-5 μs, 5-30 kHz PRF, and 15-50 CR. The spectrogram was input as a 256×256×2 IQ image. The resulting validation accuracy was 95.6% in the presence of typical interference. Moreover, detection was possible even over a range of SNRs that was wider than what the network 400 was trained on. In addition, even with strong in-band interference, a signal detection network 400 in accordance with embodiments of the present disclosure can detect pulsed signals down to 0 dB SNR with a probability of detection of 85%.

Figure 6:
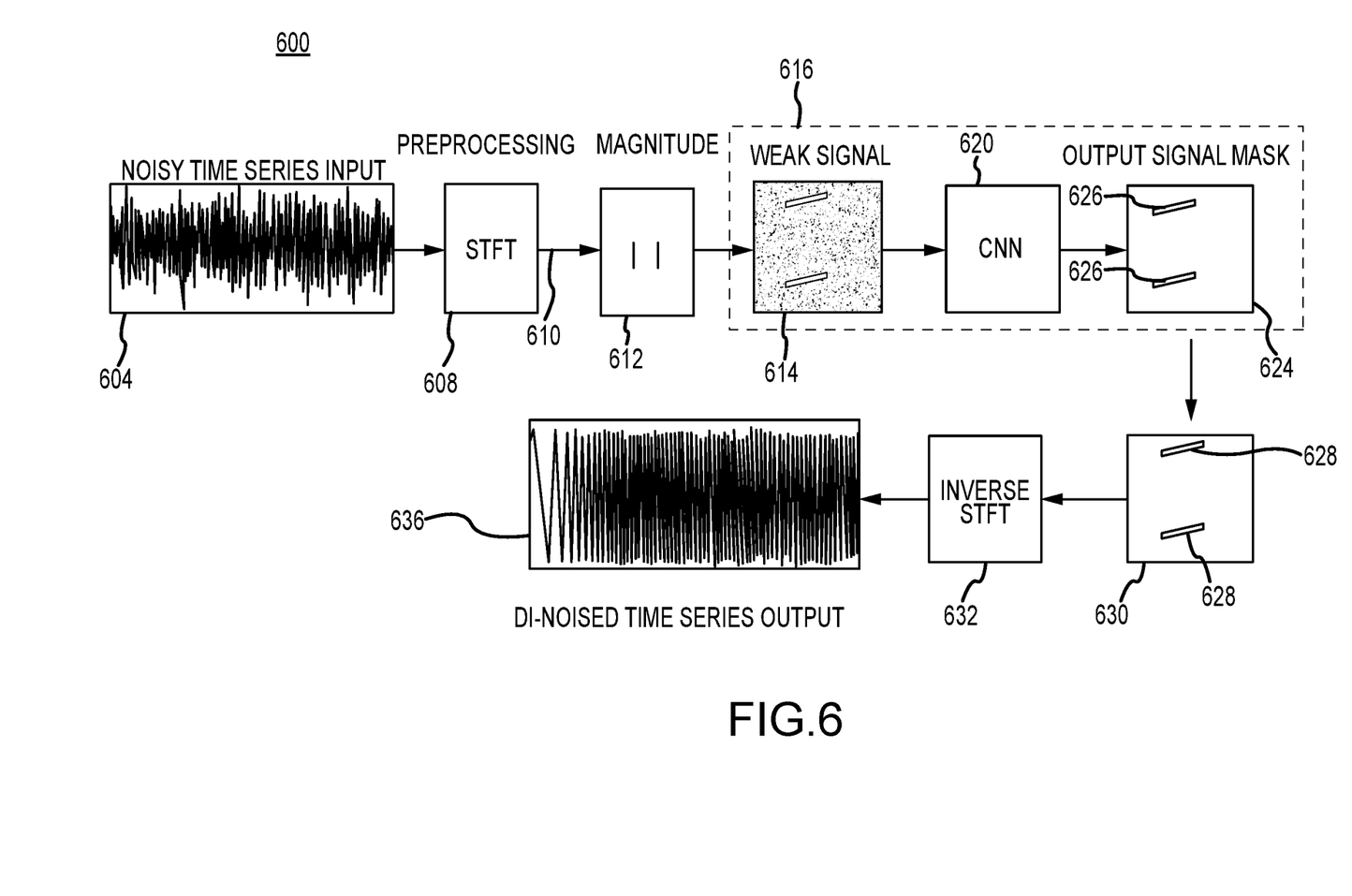
FIG. 6 depicts a signal de-noising network in accordance with embodiments of the present disclosure.

A signal processing network in accordance with further embodiments of the present disclosure configured as a de-noising network 600 that generates a de-noising mask 624 and that can further provide a de-noised time series output 636 is depicted in FIG. 6. The de-noising network 600 can be implemented by a signal processing system 300. As shown, a noisy time series of energy 604 containing signals 120 that include one or more desired signals 124 and one or more interfering signals 128 or other noise is received. The received energy 604 can include RF signals 120. Alternatively, the signals 120 are at frequencies outside of the RF spectrum. The received energy 604 can be collected by an antenna or other sensor 304, and provided to receiver circuitry 308 for conversion to a time-varying voltage 606.

The received energy 604, as represented by the time-varying voltage 606, is provided to a preprocessing block 608, which transforms the time series input 604 into a two-dimensional datagram 610, such as a time-frequency gram, for example using a Fast Fourier Transform (FFT), short time Fourier transform (STFT), a Haar transform, a wavelet transform, a Hadamard transform, a discrete cosine transform, a Gabor transform, a Karhunen-Loeve transform, or the like. In this embodiment, the magnitude of the STFT 612 is input as a spectrogram 614 to a neural network 616. The neural network 616 can include a convolutional neural network (CNN) 620. The CNN can be implemented by the execution of instructions 328 by the processor 312. The output is a de-noising or output signal mask 624 that includes one or more segments 626 that highlight the location of desired signals 124 within the area of the spectrogram. Specifically, the signal mask 624 can be a binary mask that excises the location of a desired signal or signals 124 from other signals and noise 120. The output signal mask 624 can have the same dimensions and parameters as the datagram or datagrams 614 that were input to the network 600. The output signal mask 624 is overlaid onto the original 2D spectrogram 614, to provide an output spectrogram 630 in which the desired signals 124 present in the original spectrogram 614 are excised 628. An inverse transform 632, for example an inverse STFT where a Fourier transform was initially used to create the input datagram 614, is then performed on the excised signal 628, resulting in a de-noised time series output 636. The inverse transform 632 function can be implemented by the execution of instructions 328 by the processor 312. The de-noised time series signal 636 can be provided to a conventional receiver implemented by or included in the signal processing system 300, or to a receiver or other nodes connected to or otherwise in communication with the signal processing system 300.

Figure 7:
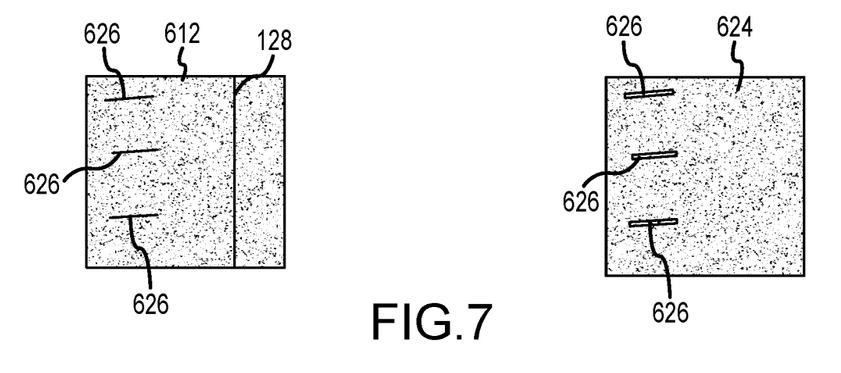
FIG. 7 depicts an example of input signals and a corresponding de-noising mask in accordance with embodiments of the present disclosure.
Figure 8:
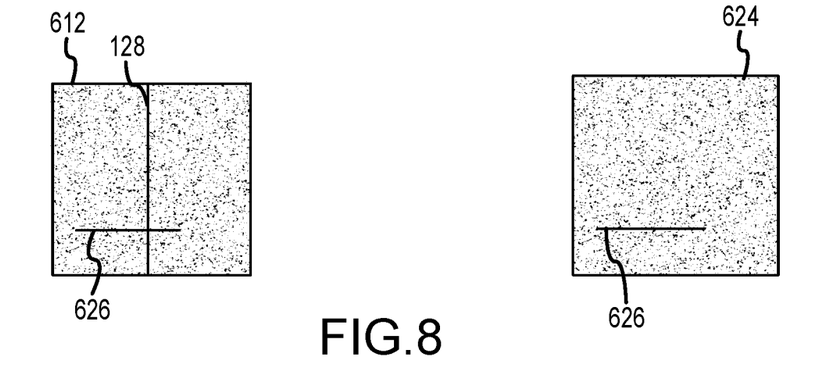
FIG. 8 depicts an example of input signals and a corresponding de-noising mask in accordance with other embodiments of the present disclosure.
Figure 9:
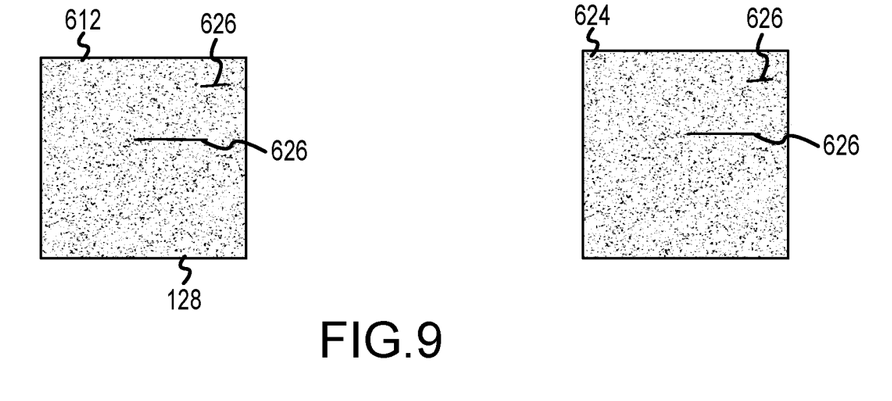
FIG. 9 depicts an example of input signals and a corresponding de-noising mask in accordance with other embodiments of the present disclosure.

Accordingly, the de-noising network 600 can be tasked with identifying signal 120 parameters from a time series signal 604. These signal 120 parameters can include SNR, start frequency, chirp rate, pulse width, repetition interval (PRI), and bandwidth. The de-noising network 600, and in particular the CNN 620 included therein, can be trained using 2D spectrograms as in signal detection embodiments, but here the network output is a same-sized binary mask 624 that includes one or more segments 626 at the locations of the detected signal or signals 120, and in particular of a desired signal or signals 124. In accordance with further embodiments of the present disclosure, the de-noising network 600 can provide an output spectrogram 630 in which the de-noised signal or signals 124 have been excised from some or all of the noise that was present in the original spectrogram 614. Accordingly, the de-noising network 600 can simultaneously act as a signal detector and de-noising circuit. Moreover, all of the signal parameters can be extracted directly from the mask 624, which has the same dimensions as the original spectrogram 614, by overlaying the mask 624 on top of the original spectrogram 614. Examples of desired or target signals 124 present in input signal spectrograms 614 containing interfering or undesired signals 128 and noise, and the output signal masks 624 with their included segments 626 produced in response to receiving the noisy input signal grams 614, are depicted in FIGS. 7-9.

Figure 10:
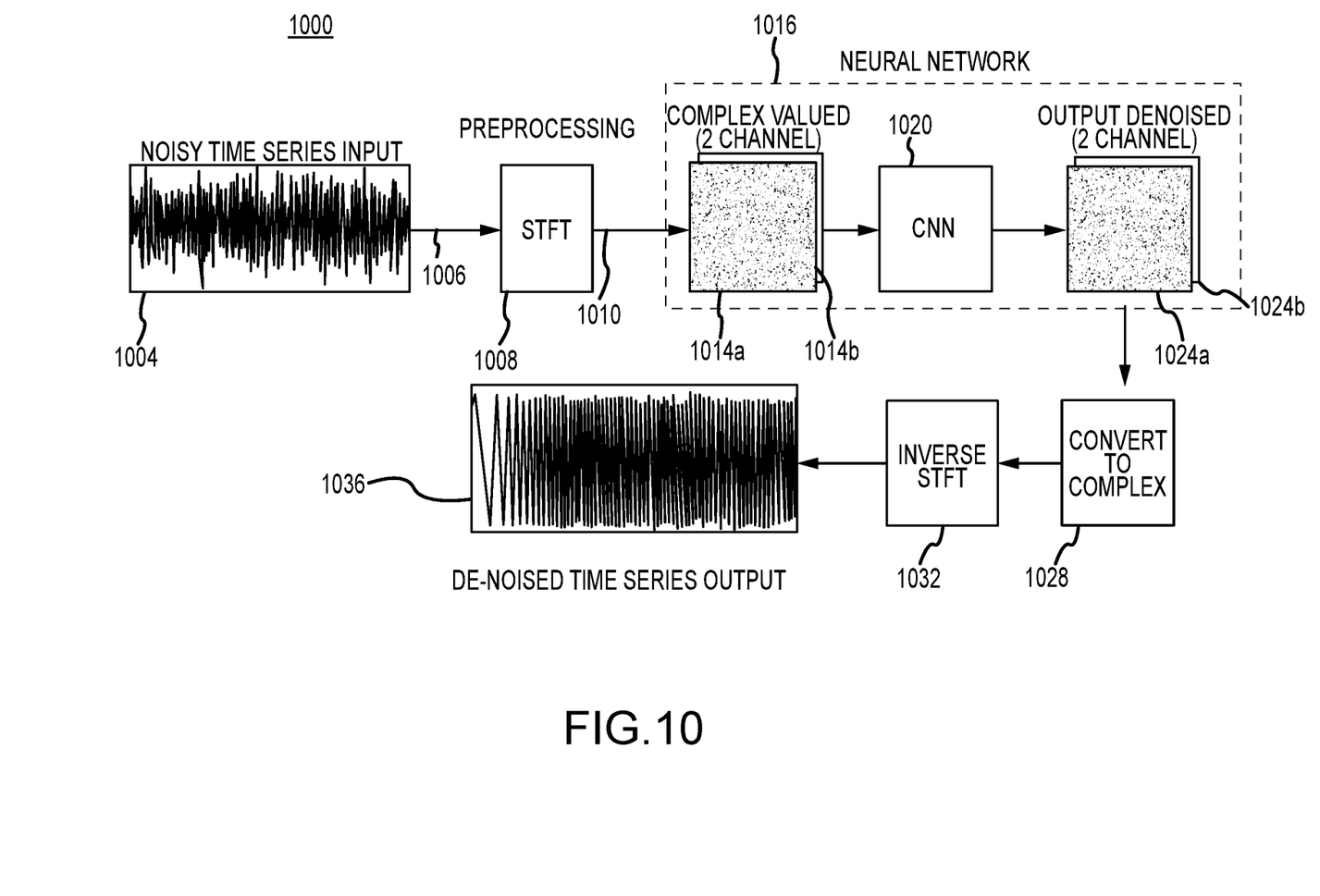
FIG. 10 depicts an example of a signal detection and de-noising network in accordance with other embodiments of the present disclosure.

FIG. 10 depicts elements of a signal processing network, and in particular a signal detection and denoising network 1000, in accordance with other embodiments of the present disclosure. The signal detection and denoising network 1000 can be implemented by a signal processing system 300 to provide a de-noised time series output 1036. Here, a noisy time series input 1004 that includes any number of time series signals 120 is received. As in other embodiments, the received time series energy 1004 can include RF signals, or signals outside of the RF spectrum. The received time series energy 1004 can be collected by an antenna or other sensor 304 and provided to receiver circuitry 308 for conversion to a time varying voltage 1006.

The received energy 1004, as represented by the time-varying voltage 1006, is transformed in a transform block 1008 from a time series signal to a two-dimensional datagram 1010, for example a time-frequency gram. As an example, the transform block 1008 may be implemented by the execution of instructions 328 by the processor 312, and may perform a fast Fourier transform (FFT), a short-time Fourier transform (STFT), a Haar transform, a wavelet transform, a Hadamard transform, a discrete cosine transform, a Gabor transform, a Karhunen-Loeve transform, or the like of the time varying voltage 1006 to create the two-dimensional datagram 1010. As can be appreciated by one of skill in the art after consideration of the present disclosure, a time-frequency gram 1010 created using a Fourier or some other transforms and output from the transform block 1008 includes real and imaginary values. In accordance with embodiments of the present disclosure, the real values are input to a neural network 1016 as a first channel of information, and the imaginary values are input to the neural network 1016 as a second channel of information. Moreover, the real data, representing the magnitude of the input RF energy 1004, is provided as a first two-dimensional datagram or spectrogram 1014a to the first channel of the neural network 1016, and the imaginary data, representing the phase of the input RF energy 1004, is provided as a second two-dimensional datagram or spectrogram 1014b to the second channel of the neural network 1016. More particularly, the real and imaginary 2D spectrograms 1014 are input to a convolutional neural network 1020 as stacked I/Q data. The dimensions of the first 1014a and second 1014b input datagrams are the same as one another, and are provided as stacked inputs to the two input channels of the signal processing network 1000. The CNN 1020 provides first (real) 1024a and second (imaginary) 1024b de-noised channels as output. More particularly, the de-noised real output 1024a is provided as a first two-dimensional frequency gram, and the de-noised imaginary output 1024b is provided a second two-dimensional frequency gram. The first 1024a and second 1024b output datagrams have the same dimensions as the first 1014a and 1014b input datagrams. The first and second channels 1024a and 1024b are then converted to a complex valued output 1028 that is in turn provided to an inverse STFT block 1032 to be output as a de-noised time series output 1036. The conversion to a complex valued output 1028 and the inverse STFT process can be implemented by the execution of instructions 328 by the processor 312. Moreover, the output 1036 can be provided to a receiver implemented by or included in the signal processing system 300, or to a receiver to other nodes connected to or otherwise in communication with the signal processing system 300.

A signal detection network in accordance with embodiments of the present disclosure can therefore include a CNN 1020 to produce de-noised real and imaginary datagrams 1024, including but not limited to spectrograms, that can be used to produce a de-noised, time series output 1036 of a desired signal 124, instead of simply a binary mask. The de-noised time series output 1036 is recovered using an inverse transform 1032, such as an inverse STFT, of the complex valued output 1028. Moreover, the network 1000 can learn more optimal nonlinear filtering to excise a desired signal 124 from noise and interference.

Embodiments of the present disclosure can provide an advance over conventional energy detection systems, which may miss weak signals. Moreover, whereas conventional energy detection systems may incorrectly indicate the presence of a signal 124 in response to the presence of interfering signals 128 in a noisy environment, embodiments of the present disclosure can more accurately indicate the presence of a desired signal 124.

Moreover, embodiments of the present disclosure feature deep learning architectures that provide improved signal detection, signal classification, and parameter characterization. In addition, embodiments of the present disclosure can process complex valued information and retain the information contained in the weak signal after extraction, can be trained ahead of time, can continue to train during deployment for improved performance, and can be implemented in software so upgrades can be applied after the system has been deployed.

Aspects of embodiments of the present disclosure include leveraging deep learning to detect weak signals in noise with greater sensitivity and accuracy as compared to classical energy detection techniques using thresholding. Operation of the network can be extended to include signal detection in noise plus interference within the signal's shared bandwidth. The network operates by taking in RF time series data and transforming it into a two-dimensional datagram, such as but not limited to a two dimensional time-frequency "gram", also called a spectrogram. The two-dimensional datagram is used as the input to a convolutional neural network (looks like an image). The real and complex-valued data from the datagram is applied to first and second channels respectively of the network. The datagram is a 2D matrix. Where the datagram is a spectrogram, one axis is time, and the other is frequency. Moreover, the datagram has complex (real and imaginary) values. The complex data is stacked: the real data is placed into the first channel of the input, the imaginary data is placed into the second channel of the input. Moreover, the datagram input to the first channel has the same dimensions as the datagram input to the second channel.

In accordance with embodiments of the present disclosure, a signal processing network as provided herein can be included in or implemented as part of communication or signal detection system nodes or components. For example, a signal processing network in accordance with embodiments of the present disclosure can be implemented as part of a radio frequency installation 102, as part of a communication device 110, or as part of any other communication network device or node. In accordance with further embodiments of the present disclosure, a signal processing network as provided herein can be implemented as part of a system or device that is not part of a communication system, such as a signal detection and warning system, a signal surveillance system, a warning system, a radar system, a sonar system, or the like. Moreover, a signal processing network as provided herein can be implemented by a signal processing system 300 that is provided as an adjunct to another component or device, or implemented as part of another component or device. The signal processing network can be co-located with a receiver of a noisy time series input and/or a receiver or consumer of a de-noised time series output produced by the signal processing network. Alternatively, the signal processing network can be located remotely relative to a receiver of a noisy time series input and/or a receiver or consumer of a de-noised time series output produced by the signal processing network. In accordance with still other embodiments, a signal processing network as provided herein can be operated in real-time, or in a post-processing mode, to detect, de-noise, and/or extract desired signals 124 in noisy environments.

Embodiments of the present disclosure have application in a variety of radio frequency systems, including but not limited to 5G communications systems, satellite communication systems, radar warning receivers, and the like. Moreover, embodiments of the present disclosure can be configured to operate in connection with signals other than RF signals, including but not limited to sonar and optical signals.

As an example, in connection with a 5G communication system, embodiments of the present disclosure can be implemented as part of a base station 104. The base station 104 may be operated such that beams emanating from the base station 104 antenna 304 are pointed in different directions to search for signals arriving at the base station from different directions, either directly or through reflection. As discussed herein, the neural network 416 implemented as part of the signal processing network can detect a desired signal 124 even in a noisy environment in which alternate systems may be incapable of indicating the presence of the signal. The beam pattern produced by the base station 104 antenna 304 can then be directed to produce a favorable gain for initiating communication with the communication device 110 operating as a source of the desired signal 124.

As another example, in connection with a radar warning receiver 118, a target signal 124 transmitted by a hostile or potentially hostile radar or other installation 102 or device 110 to be detected. Embodiments of the present disclosure enable target signals 124 to be detected in the presence of noise, and even when the signal 124 itself is weak. Moreover, the detection can be made even where characteristics of the signal 124, such as but not limited to the frequency, pulse width, chirp rate or other signal characteristics are not known in advance. In particular, in place of a relatively complex algorithm, embodiments of the present disclosure can utilize a trained neural network 416 to identify the signal 124, and provide output in the form of a characterization of the signal 124, based on training that includes examples of signals having different parameters. By enabling the detection of weak and previously unknown signals, embodiments of the present disclosure can provide a warning of a potentially hostile target signal 124 in circumstances in which a conventional threat warning receiver would be inoperable. Accordingly, countermeasures, for example taken by an aircraft or other vehicle carrying a signal processing system in accordance with embodiments of the present disclosure can be taken with more "time to go" than would otherwise be available.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for processing a signal, comprising:
    transforming a time series signal into a first spectrogram, wherein the first spectrogram is a real valued two-dimensional spectrogram, and into a second spectrogram, wherein the second spectrogram is an imaginary valued two-dimensional spectrogram;
    providing the real valued two-dimensional spectrogram to a first channel of a neural network;
    providing the imaginary valued two-dimensional spectrogram to a second channel of the neural network, wherein the first channel is separate from the second channel, and wherein the neural network is trained to identify a desired signal; and
    analyzing the real valued two-dimensional spectrogram in the first channel of the neural network and analyzing the imaginary valued two-dimensional spectrogram in the second channel of the neural network as part of generating an output.

2. The method of claim 1, wherein the real valued two-dimensional spectrogram is provided to the first channel of the neural network as a first two-dimensional image, and wherein the imaginary valued two-dimensional spectrogram is provided to the second channel of the neural network as a second two-dimensional image.

3. The method of claim 1, wherein the time series signal is transformed into the first, real valued two-dimensional radio frequency spectrogram and into the second, imaginary valued two-dimensional radio frequency spectrogram by performing a Fourier transform of the time series signal.

4. The method of claim 3, wherein the output is an indication as to whether a desired signal is present in the time series signal.

5. The method of claim 1, wherein analyzing the real valued two-dimensional spectrogram and the imaginary valued two-dimensional spectrogram includes identifying a location of at least a first desired signal in the two-dimensional spectrograms, and wherein the output is a de-noising mask having one or more segments corresponding to one or more desired signals.

6. The method of claim 5, wherein providing the real valued two-dimensional spectrogram and the imaginary valued two-dimensional spectrogram includes performing a Fourier transform of the time series signal and providing magnitude components of the transformed signal to the neural network.

7. The method of claim 6, wherein the de-noising mask is a two-dimensional mask having dimensions that are the same as the dimensions of the two-dimensional spectrograms provided to the neural network.

8. The method of claim 7, further comprising:
    applying the de-noising mask to the two-dimensional spectrograms provided to the neural network to create an output two-dimensional spectrogram in which the desired signal or signals are excised from noise.

9. The method of claim 8, further comprising:
    inverse transforming the output two-dimensional spectrograms to create a de-noised time series output.

10. The method of claim 1, wherein analyzing the two-dimensional spectrograms includes the first channel of the neural network providing a first output datagram in the form of a de-noised real valued two-dimensional spectrogram and the second channel of the neural network providing a second output datagram in the form of a de-noised imaginary valued two-dimensional spectrogram.

11. The method of claim 10, further comprising:
    converting the de-noised real valued two-dimensional spectrogram and the de-noised imaginary valued two-dimensional spectrogram into a complex valued output; and
    converting the complex valued output into a de-noised time series signal using an inverse Fourier transform.

12. The method of claim 1, further comprising:
    providing the output to a receiver device.

13. The method of claim 12, further comprising:
    in response to the output, steering an antenna beam.

14. The method of claim 1, wherein the output is an indication of the presence of a desired signal.

15. A system, comprising:
    a sensor, wherein the sensor is operable to receive a time series signal;
    receiver circuitry, wherein the receiver circuitry is operable to generate a time series voltage from the time series signal received by the sensor;
    a processor;
    memory; and
    application programming stored in the memory and executed by the processor, wherein the application programming operates to:

transform the time series voltage generated by the receiver circuitry into a firsts spectrogram, wherein the first spectrogram is a real valued two-dimensional spectrogram, and into a second spectrogram, wherein the second spectrogram is an imaginary valued two-dimensional spectrogram;

implement a neural network having first and second channels, wherein the neural network is trained to process the first two-dimensional spectrogram in the first channel of the neural network, and wherein the neural network is trained to process the second two-dimensional spectrogram in the second channel of the neural network; and generate an output.

16. The system of claim 15, wherein the output is an indication of the presence of a desired signal in the received time series signal.

17. The system of claim 15, wherein the application programming further operates to:

generate a de-noised real valued two-dimensional spectrogram;

generate a de-noised imaginary valued two-dimensional spectrogram;

convert the de-noised real and imaginary two-dimensional spectrograms into a complex valued output; and transform the complex valued output to a de-noised time series signal.

18. The system of claim 17, wherein the time series voltage is transformed using a Fourier transform.

19. The system of claim 18, wherein the application programming further operates to implement an inverse Fourier transform to generate the de-noised time series signal.

20. The system of claim 15, wherein the sensor is an antenna.

* * * * *

UNITED STATES PATENT AND TRADEMARK OFFICE
CERTIFICATE OF CORRECTION

PATENT NO. : 10,879,946 B1  
APPLICATION NO. : 16/668826  
DATED : December 29, 2020  
INVENTOR(S) : James M. Shima Page 1 of 1

It is certified that error appears in the above-identified patent and that said Letters Patent is hereby corrected as shown below:

In the Claims

In Claim 15, Column 13, Line 2: Please delete "firsts" and insert --first--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*